US010816641B2

(12) United States Patent
Koerber et al.

(10) Patent No.: US 10,816,641 B2
(45) Date of Patent: Oct. 27, 2020

(54) IMAGING RADAR SENSOR WITH SYNTHETIC ENLARGEMENT OF THE ANTENNA APERTURE AND TWO-DIMENSIONAL BEAM SWEEP

(75) Inventors: Richard Koerber, Hallerndorf (DE); Felix Hoehne, Aschheim (DE)

(73) Assignee: ASTYX GmbH, Ottobrunn (DE)

( * ) Notice: Subject to any disclaimer, the term of this patent is extended or adjusted under 35 U.S.C. 154(b) by 1071 days.

(21) Appl. No.: 14/343,849

(22) PCT Filed: Sep. 4, 2012

(86) PCT No.: PCT/EP2012/003702
§ 371 (c)(1),
(2), (4) Date: Jun. 24, 2014

(87) PCT Pub. No.: WO2013/034282
PCT Pub. Date: Mar. 14, 2013

(65) Prior Publication Data
US 2014/0306840 A1    Oct. 16, 2014

(30) Foreign Application Priority Data

Sep. 9, 2011   (DE) .................. 10 2011 113 015

(51) Int. Cl.
*G01S 7/03* (2006.01)
*G01S 13/34* (2006.01)
(Continued)

(52) U.S. Cl.
CPC .............. *G01S 7/032* (2013.01); *G01S 13/34* (2013.01); *G01S 13/422* (2013.01);
(Continued)

(58) Field of Classification Search
CPC ........ G01S 7/032; G01S 13/34; G01S 13/931; G01S 13/4445; G01S 13/422;
(Continued)

(56) References Cited

U.S. PATENT DOCUMENTS 6,246,359 B1 * 6/2001 Asano ............... G01S 13/34
342/118
2004/0246168 A1 * 12/2004 Isaji ................. G01S 7/03
342/70
(Continued)

FOREIGN PATENT DOCUMENTS

DE    10 2004 044120    3/2006
DE    102008052246    4/2010
(Continued)

OTHER PUBLICATIONS

Office Action for corresponding Japanese Patent Application No. 2014-528893 dated Jun. 7, 2016 with English translation.
(Continued)

*Primary Examiner* — Erin F Heard
*Assistant Examiner* — Helena H Seraydaryan
(74) *Attorney, Agent, or Firm* — Fish & Richardson P.C.

(57) ABSTRACT

A device and a method for determining the position of an object, in particular of a moving object, in a three dimensional space is made available. Here the device comprises at least two switchable transmitting antenna arrays having different vertical beam alignments and a number of receiving antennas arranged in a row. The transmitting antennas are arranged spaced apart by a distance that corresponds to the distance between the outer phase centers of the receiving antennas. Otherwise the transmitting antennas can be positioned arbitrarily around the receiving antenna. The horizontal beam sweep over a wide angle range is implemented by the "digital beam forming" method. The vertical object position is measured by comparing the amplitude of the received signals with sequentially operated transmitting antennas having different vertical beam directions.

12 Claims, 4 Drawing Sheets

(51) Int. Cl.
*G01S 13/93* (2006.01)
*G01S 13/44* (2006.01)
*G01S 13/42* (2006.01)
*H01Q 21/22* (2006.01)
*H01Q 21/06* (2006.01)
*G01S 13/931* (2020.01)

(52) U.S. Cl.
CPC ........ *G01S 13/4445* (2013.01); *G01S 13/931* (2013.01); *H01Q 21/065* (2013.01); *H01Q 21/22* (2013.01); *G01S 2013/93275* (2020.01)

(58) Field of Classification Search
CPC ........... G01S 2013/9389; G01S 7/4008; G01S 13/89; G01S 7/03; H01C 21/22; H01C 21/065; H01Q 21/22; H01Q 21/065
USPC ........................................................ 342/107
See application file for complete search history.

(56) References Cited

U.S. PATENT DOCUMENTS

| | | | |
|---|---|---|---|
| 2005/0275585 A1* | 12/2005 | Shima | G01S 7/4008 342/174 |
| 2007/0279303 A1 | 12/2007 | Schoebel | |
| 2008/0012765 A1* | 1/2008 | Xu | G01S 13/4418 342/442 |
| 2008/0100510 A1 | 5/2008 | Bonthron et al. | |
| 2008/0291077 A1* | 11/2008 | Chang | G01S 13/89 342/59 |
| 2008/0303711 A1 | 12/2008 | Matsuoka | |
| 2011/0074620 A1* | 3/2011 | Wintermantel | G01S 7/032 342/70 |
| 2011/0074621 A1 | 3/2011 | Wintermantel | |
| 2011/0080314 A1 | 4/2011 | Wintermantel | |

FOREIGN PATENT DOCUMENTS

| | | |
|---|---|---|
| DE | 10200061932 | 7/2010 |
| DE | 10 2009 029291 | 3/2011 |
| JP | 2008-304417 | 12/2008 |
| WO | 2010/066458 | 6/2010 |
| WO | 2011/029643 | 3/2011 |

OTHER PUBLICATIONS

International Search Report for PCT/EP2012/003702 dated Feb. 14, 2013.
Japanese Patent Office; Office Action dated Feb. 28, 2017 in corresponding Japanese Patent Application No. 2014-528893 (and English-language translation thereof).
Chinese Office Action in Application No. 2012003702, dated Jan. 16, 2017, 16 pages.
Chinese Office Action in Application No. 2012003702, dated Jul. 29, 2015, 15 pages.
Chinese Office Action in Application No. 2012003702, dated Jun. 12, 2016, 17 pages.
Chinese Office Action in Application No. 2012003702, dated May 31, 2016, 19 pages.
Dr. Winfried Mayer, "Imaging radar sensor with antenna array connected on the transmitting side", Cuvillier Verlag, Gottingen 2008, ISBN 978-3-86727-565-1 (with machine translation).
Kees et al, "Improvement of angular resolution of a millimeterwave imaging system by transmitter location multiplexing" in IEEE MTT-S Int. Mierow. Symp. Dig., Orlando, FL. May 1995, vol. 2, pp. 969-972.
KR Office Action in Korean Appln. No. 2014-7007430, dated May 17, 2019, 10 pages (with English translation).
KR Office Action in Korean Appln. No. 2020-7013433, dated Jun. 3, 2020, 5 pages (with English translation).
EP Office Action in European Appln. No. 127698991, dated September 4, 2020, 24 pages (with English translation)

* cited by examiner

IMAGING RADAR SENSOR WITH SYNTHETIC ENLARGEMENT OF THE ANTENNA APERTURE AND TWO-DIMENSIONAL BEAM SWEEP

BACKGROUND OF THE DISCLOSURE

The invention relates to a method for increasing the angular resolution of imaging radar sensors with a limited available antenna aperture and a method for two-dimensional beam sweep.

Millimeter wave radar sensors, e.g. for automotive applications, should have a compact and inexpensive construction. This means that the available surface for the antenna is to be kept as small as possible and the number of high frequency components should be minimised.

On the other hand, the sensor should exhibit a high angular resolution which, however, requires a large antenna surface—a so-called aperture.

This conflict of requirements is advantageously resolved by the following invention. The antenna aperture of the radar sensors can be reduced here almost by the factor of two while the angular resolution remains the same.

A further requirement is recognition of the tail end of a traffic jam on the road. A distinction must be made here between stationary vehicles and bridges and manhole covers. Furthermore, three-dimensional measurement of the objects is desired in order to classify objects. This object is advantageously achieved by horizontal and vertical beam sweep.

The dissertation by Dr. Winfried Mayer entitled "Imaging radar sensor with antenna array connected on the transmitting side", Cuvillier Verlag, Göttingen 2008, ISBN 978-3-86727-565-1 discloses a method and a device which monitors an area with digital beam forming technology in which an antenna array with a number of transmitters and a number of receivers is used.

By means of the chronologically consecutive use of the transmitters the antenna opening angle can be reduced without the physical size of the receiving antenna thereby increasing.

With radar sensors this method works well provided the objects to be detected do not move and a number of objects lying close together are to be detected.

The movement of objects generally causes imaging errors, the echos of objects lying close together overlap and this can lead to false and ambiguous images.

DE 10 2008 061 932 A1 discloses a method wherein the transmitting antennas are arranged behind the receiving antennas as viewed in the direction of looking at the object. The movement of objects can be corrected by this arrangement, but this type of antenna arrangement is not advantageous with regard to the radiating characteristics of the antennas.

DE 10 2008 052 246 A1 describes a sensor system with adjustable elevation beam direction for the vertical positioning of objects. The adjustment is made here by the mechanical movement of a reflector.

In the publication "N. Kees. E. Schmidhammer and J. Detlefsen "Improvement of angular resolution of a millimeterwave imaging system by transmitter location multiplexing" in IEEE MTT-S Int. Microw. Symp. Dig., Orlando, Fla. May 1995, vol. 2, pages 969-972" a method for producing a synthetic antenna aperture is described, with the aid of which the antenna beam width is reduced and so the angular resolution can be improved.

BRIEF SUMMARY OF THE DISCLOSURE

In an embodiment, a device for determining a position of an object is provided. The device includes at least two switchable transmitting antenna arrays (36). Each of the transmitting antenna array (36) having a number of transmitting antennas (10) which differ from one another as regards their main beam directions. The device including a receiving antenna arrangement comprising a plurality of receiving antennas (20) which are arranged next to one another in a continuous row starting from a first and ending at a last. The transmitting antenna arrays (36) being arranged such that the distance between two transmitting antennas (10) with the same main beam direction is equal to the distance (D) between the first receiving antennas (20) and the last receiving antenna (20) or is equal to the sum of the distance (D) between the first receiving antennas (20) and the last receiving antenna (20) and of the distance between two adjacent receiving antennas (20). The distances respectively relate to the focal points of the transmitting antennas (10) and the receiving antennas (20) and respectively to a direction running from the last to the first.

In an embodiment, a method for determining a position of an object is provided. The method includes receiving a series of received signals transmitted consecutively in time by antennas with different main beam directions and reflected on the object by a number of multiple receiving antennas arranged in a row. The method also includes digitalising the received signals and combining the received signals by the digital beam forming method to form a bundled antenna beam. The method also includes making a speed correction and a distance correction by means of a two-dimensional FFT by comparing output signals of overlapping lines of antennas which correspond to the bundled antenna beam. The method also includes comparing the amplitude of the received signals with different main beam directions of the transmitter with the same distance value and the same speed value. The method also includes displaying the position of the object.

BRIEF DESCRIPTION OF THE DRAWINGS

In the following exemplary embodiments of the invention are explained in more detail by means of figures. Parts corresponding to one another are provided with the same reference numbers in all of the figures. These show as follows.

DETAILED DESCRIPTION OF THE DISCLOSURE

The object of the invention is to make available a device, a method and a radar system by means of which the imaging errors described above are avoided. Furthermore, it is the object of the invention to make available a device and a method with which a vertical position of an object can be determined.

The objects are achieved by the features of the independent claims.

A device for determining a position of an object, in particular a moving object, comprising at least two switchable transmitting antenna arrays is provided. Here each transmitting antenna array has transmitting antennas which differ from one another as regards their main beam directions. A receiving antenna arrangement contains a plurality of receiving antennas which are arranged next to one another in a row running from left to right or next to one another in a row starting from a first and ending at a last receiving antenna.

The transmitting antenna arrays are arranged such that the distance between two transmitting antennas with the same vertical beam direction is equal to the distance between the left outer or first receiving antennas and the right outer or last receiving antenna or is equal to the sum of the distance between the left outer or first receiving antennas and the right outer or last receiving antenna and of the distance between adjacent receiving antennas.

The distances respectively relate here to the focal points of the transmitting antennas and the receiving antennas and to a direction running from right to left or a direction running from the last to the first.

Dividing up into transmitting antenna arrays means that when they are activated with a time offset, a so-called synthetic aperture can be produced which is greater than the real apertures. For example, the number of receivers with two transmitting antenna arrays in the synthetic aperture is twice as great as in the real aperture. However, the distance between the transmitting antenna arrays must be chosen carefully here. With the plurality of transmitting antenna arrays the real aperture, and so the surface of the overall antenna, can therefore be kept relatively small, the angular resolution through the synthetic aperture nevertheless being high. The small surface is particularly important for applications in which the available space is very limited, for example in automotive applications. The different main beam directions enable a vertical beam sweep, and this makes it possible to detect false targets, such as for example bridges.

Preferably, at least the outer receiving antennas respectively have at least three lines of antennas running parallel. A middle line of the lines of antennas of the receiving antennas respectively forms a phase centre of the receiving antenna and the distances respectively relate to the focal points of the phase centres of the receiving antennas. With a number of lines of antennas per outer or last receiving antenna amplitude allocation is made possible.

In one embodiment the distance between two adjacent receiving antennas relates to receiving antennas which respectively have at least three lines of antennas running parallel, and a middle line of the lines of antennas of the receiving antennas respectively forming a phase centre of the group and the distances respectively relating to the focal points of the phase centres of the receiving antennas. It is taken into account here that a number of receiving antennas, which lie next to one another in the outer region of the row, respectively have a number of lines of antennas.

If receiving antennas lying on the inside have no more than one line of receiving antennas, these are particularly suitable for the detection of objects at close range.

In one embodiment the outer transmitting antennas respectively have at least three lines of antennas running parallel, and a middle line of the lines of antennas of the transmitting antennas respectively forms a phase centre of the group and the distances respectively relate to the focal points of the phase centres of the transmitting antennas.

Moreover, a frequency generator is preferably provided to produce signals which are issued by the transmitting antennas of the first transmitting antenna array in a first cycle and by the transmitting antennas of the second transmitting antenna array in a chronologically following second cycle.

Here, within one cycle the transmitting antennas of one transmitting antenna array transmit with different main beam directions consecutively in time.

According to a further aspect of the application the device for determining a position of an object, in particular of a moving object, in a three-dimensional space, comprises at least two transmitting antenna arrays, a number of multiple receiving antennas arranged in a row, the transmitting antenna arrays being arranged apart from one another by a distance d, this distance corresponding to the distance between the outermost left or first receiving antenna and the outermost right or last receiving antenna. Alternatively, a distance d+dx can be chosen, dx being the distance between the individual receiving lines or the distance between the phase centres of the receiving antenna arrays.

Otherwise, the transmitting antennas can be arranged in any position to the side of or opposite the receiving antennas.

The device further comprises a frequency generator for producing signals which are issued consecutively in time by the transmitting antennas, at least one processing unit for making at least one connection between the received signals issued by the receiving antennas by the digital beam forming method in order to produce a bundled antenna beam and in order to make a speed correction and/or a distance correction by means of a two-dimensional FFT by comparing output signals of the overlapping lines of antennas, corresponding to the bundled antenna beam, and a display device for showing the position of the object.

The method according to the invention for determining a position of an object, in particular a moving object, comprises at the very least the procedural steps of receiving a series of received signals transmitted consecutively in time and reflected on the object by a number of multiple receiving antennas arranged in a row, digitalising the received signals, combining the received signals by the digital beam forming method to form a bundled antenna beam, making a speed correction and a distance correction by means of a two-dimensional FFT (Fast Fourier Transformation) by comparing output signals of overlapping lines of antennas or by means of a Doppler correction matrix which correspond to the bundled antenna beam, and displaying the position of the object.

In one arrangement of the transmitting antenna arrays spaced apart by the distance d on the one hand the overlapping of the line of receiving antennas lying outermost on the right, or the last line of receiving antennas, and the synthetic line of antennas lying outermost on the left, or the first synthetic line of antennas, is made possible, from which a phase correction matrix for the Doppler correction can be derived. If the transmitting arrays are positioned spaced apart by the distance d+dx, no overlapping of receiving lines takes place. The size of the synthetic array is maximal here. In order to compensate for image distortion by the movement of objects, in this case a speed-dependent phase correction of the range-Doppler matrix is to be made which is calculated from the time offset of the left or first and the right or last transmitting signals.

The position of an object in the space is determined from a distance by the frequency offset between the transmitted and the received signal. The position in the azimuth is made possible by the digital beam sweep of the receiver array. The vertical position is determined by the use of 3 transmitting antennas which have different vertical viewing directions, to the top, to the middle and to the bottom. The transmitting antennas are operated one after the other here. The received signals have different amplitudes depending on which of the transmitting antennas was used for the detection method. By comparing the amplitude of the 3 receiving steps the vertical position of the object can now be determined.

The features listed in the sub-claims and the respectively claimed subject matter constitute advantageous further developments.

Advantageously the number of receiving antennas that the device has is 8, 16 or 32.

According to an advantageous further development the position of the object can be shown by means of the display device with an antenna diagram.

In an advantageous further development a speed correction is made in addition to the distance correction.

In order to achieve higher angular resolution in an observation angle range the amplitudes of adjacent antenna beams are advantageously evaluated. This is also called "sequential lobing".

In order to achieve higher angular resolution, the sum of and the difference between two adjacent antenna beams is advantageously evaluated (so-called monopulse).

Figure 1:
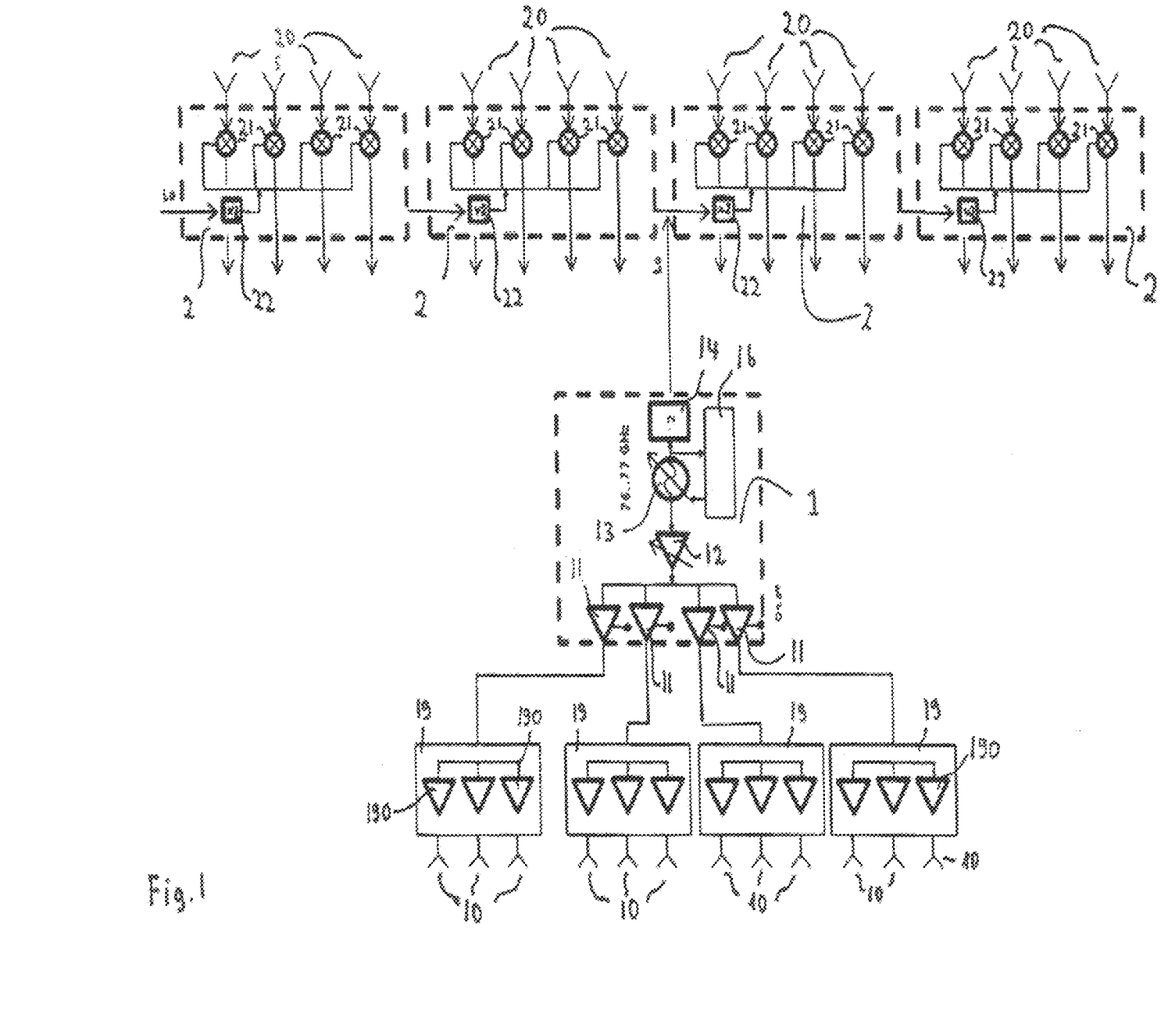
FIG. 1 schematically, the functional blocks of a radar sensor.

The invention relates to a frequency-modulated continuous wave radar (FMCW radar) according to FIG. 1 which monitors an area with the aid of digital beam forming. The radar sensor consists here of a transmitter with twelve outputs and a number of, in this case sixteen, receivers. FIG. 1 shows a transmitter with an integrated frequency modulator and four switchable outputs, four final amplifiers each having three switchable outputs and four receiver blocks each having four receiving channels. The received signals are mixed down to a base band in the receiver blocks.

Here, FIG. 1 shows a radar sensor comprising a transmitter (1), four final amplifiers (19), twelve transmitting antennas (10), four receiver blocks (2) and sixteen receiving antennas (20). The transmitter (1) contains a modulator (16), a frequency generator (13), a frequency divider (14), an adjustable amplifier (12) and switchable drivers (11). The frequency generator (13) produces an output signal the frequency of which varies between 76 and 77 GHz. The output signal is issued to the amplifier (12), the amplitude of which can be adjusted. The output signal of the amplifier (12) is issued to the inputs of four drivers (11) which can be switched on and off.

The four final amplifiers (19) respectively have three driver stages (190). The outputs of the drivers (11) are connected to the inputs of the driver stage (190) of the final amplifiers (19). The driver stages (190) in turn respectively drive one of the transmitting antennas (10).

The frequency generator (13) of the transmitter (1) also issues at its output a signal to the frequency divider (14) which issues an output signal which has half the frequency of the output signal of the frequency generator.

The receiver blocks (2) respectively contain a frequency multiplier (22) and four mixers (21). The frequency multipliers (22) receive the output signal of the frequency divider (14) of the transmitter (1), respectively produce a signal with double the frequency of their input signal, and respectively issue their generated signals to first inputs of the mixers (21). The mixers (21) are respectively connected to second inputs with respectively one receiving antenna (20) so that the signal received by the respective receiving antenna (20) is mixed down to a base band in the mixer (21). The output signals of the mixers (21) are evaluated in a processing unit not shown in FIG. 1. If objects are recognised they are shown visually on a display unit.

The radar is capable of measuring both a far range of up to for example 200 m with a narrow horizontal detection range of +/−10 degrees and a close range of up to for example 80 m with a wide detection range of +/−45 degrees.

Figure 2:
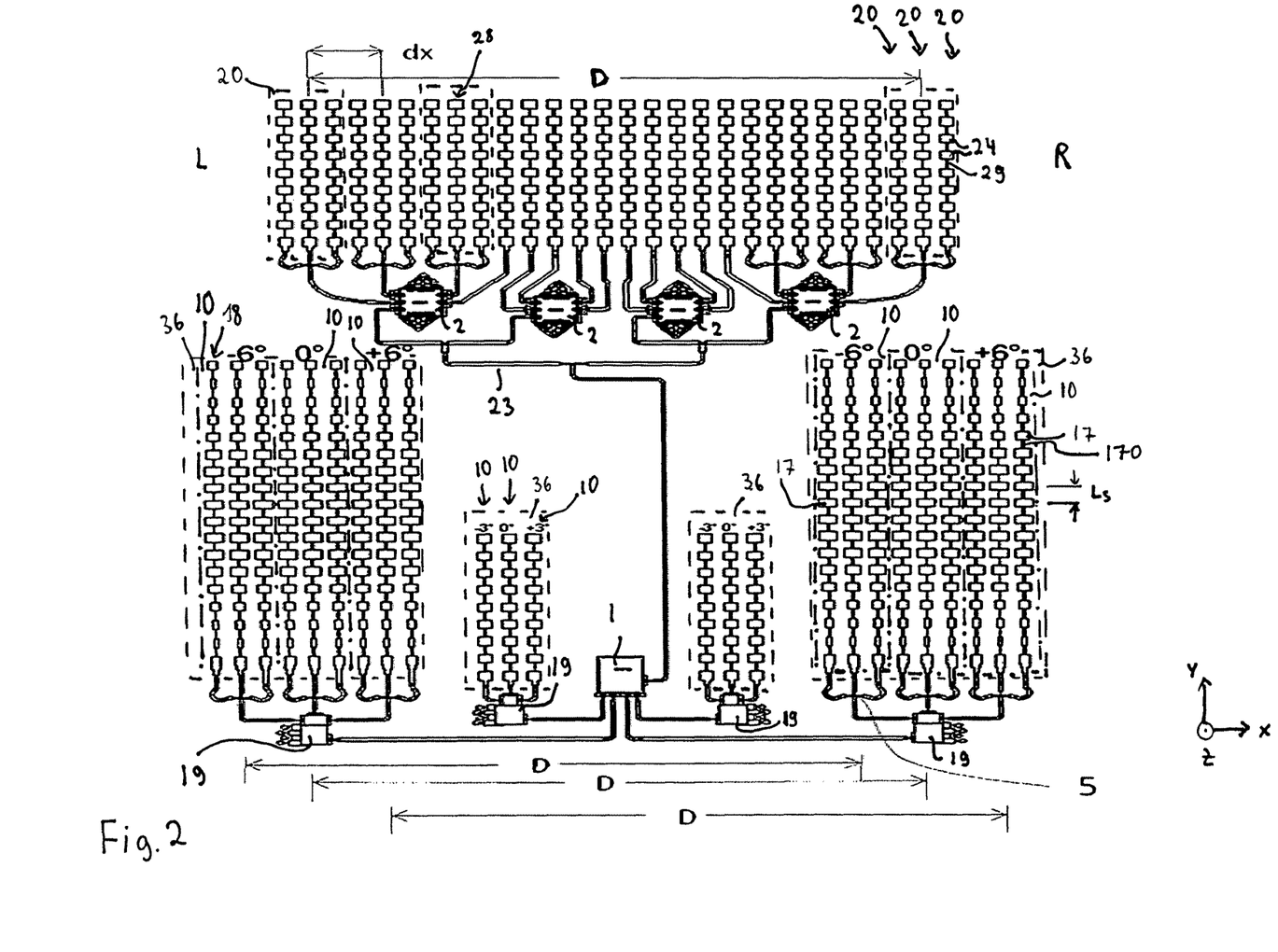
FIG. 2 the arrangement of the antennas of the radar sensor.

FIG. 2 shows the physical arrangement of the antennas. The outer receiving channels are connected to antenna arrays each having three lines of antennas. The inner receiving channels are only connected to a single line of antennas.

FIG. 2 shows here the arrangement of the transmitting antennas (10) and the receiving antennas (20) in a top view. The transmitting antennas (10) and the receiving antennas (20) are made in the form of patch antennas which extend in an x-y plane. The receiving antennas (20) respectively have so-called lines of antennas (28) which respectively consist of nine receiving beam elements (24) and connection lines (29) lying in between.

The receiving beam elements (24) of a line of antennas (28) are lined up one behind the other so that the line of antennas (28) is elongate and extends in the y direction. The lines of antennas (28) of the receiving antenna (20) all run parallel to one another and are located at the same level in relation to they direction. The lines of antennas (28) are therefore arranged next to one another in relation to the x direction, the outer lines of antennas being designated as the right or last line of antennas (28) or as the left or first line of antennas (28).

The z direction points upwards out of the page of the drawing. The z direction is the main direction in which objects are to be detected. If, for example, the radar sensor is fitted in a land vehicle and is supposed to detect objects in the direction of travel, the z direction is the direction of travel. The y direction then points upwards. In the figure right is marked by R and left by L. Here one is looking in the direction opposite to the z direction and so against the direction of travel.

The lines of antennas (28) respectively have a feed-in point with which they are connected to an input of the receiver block (2) by means of a strip line (23). Three receiving antennas (20), which respectively contain three lines of antennas (28), are provided on the left side. Also constructed on the right side are three antennas (20) also respectively having three lines of antennas (28). Ten receiving antennas (20) in the middle region respectively contain just one line of antennas (28), and so just one line of antennas (28) is respectively connected here to an input of a receiver block (2) by means of its respective feed-in point.

The transmitting antennas (10) are subdivided here into four transmitting antenna arrays (36), a distinction being made between two inner and two outer transmitting antenna arrays (36). The outer or last antenna arrays (36) respectively contain three antennas (10) which on their part respectively contain three lines of antennas (18). The inner antenna arrays (36) respectively have three antennas (10) which respectively contain, however, just one line of antennas (18).

The lines of antennas (18) respectively have transmitter beam elements (17) and connection lines (170) lying in between. The transmitter beam elements (17) of a line of antennas (18) are lined up one behind the other so that the line of antennas (18) is elongate and extends in the y direction. The lines of antennas (18) all run parallel to one another.

The lines of antennas (18) of a transmitting antenna (10) of the outer transmitting antenna array (36) respectively contain eighteen transmitter beam elements (17). Each of the three lines of antennas (18) of a transmitting antenna (10) of the outer transmitting antenna array (36) has a feed-in point which is connected to the other feed-in points of the lines of antennas (18) of the same transmitting antenna (10) by strip lines (23). The corresponding connection node is driven by a driver stage of a final amplifier (19). The transmitter beam elements of the outer transmitting antenna array (36) are configured differently, by means of which an amplitude allocation is made.

Within the outer right or last transmitting antenna array (36) and the outer left or first transmitting antenna array (36) three antennas (10) are therefore respectively provided, the antennas within the transmitting arrays (36) respectively differing with regard to the main beam direction and so with regard to their vertical beam direction.

The inner transmitting antenna arrays (36) respectively have three transmitting antennas (10) which on their pad respectively contain nine beam elements (17). For each transmitting antenna array (36) there is respectively a final amplifier (19) with three driver stages (190) to which a respective antenna (10) is connected. The transmitting antennas (10) of the inner transmitting antenna arrays (36) also respectively differ by their respective inclines. The left antenna (10) of the inner transmitting antenna array (36) squints by 3 degrees downwards, the middle antenna (10) has no inclined sight and the right antenna (10) of the inner transmitting antenna arrays (36) has sight inclined 3 degrees upwards.

The distance between the transmitting antenna (10), which squints by 6 degrees downwards, of the left outer transmitting antenna array (36) and the antenna (10) which belongs to the right transmitting antenna arrays (36) and squints by 6 degrees downwards is D. There is also the same distance between transmitting antennas (10) between the left or first transmitting antenna array (36) and the right or last transmitting antenna array (36), neither of which have inclined sight, and between the transmitting antennas (10), both of which have sight inclined by 6 degrees upwards.

The antenna arrays, i.e. the combination of a number of lines of antennas to form a receiving antenna, are required in order to increase the beam bundling in the far range mode. In this mode all of the receiver channels are activated. There are, however, embodiments in which the number of lines of antennas is not three. The central line of the lines of antennas of an antenna is called the phase centre.

In the near range mode only the inner individual lines are used. Unlike the antenna arrays, the phase centres of the receivers are closer together here so that a wide beam sweep is possible. The receiving antenna array typically has a vertical beam width of 10 degrees.

The transmitter also uses antenna arrays for the far range and individual lines for the near range. The antenna arrays and the individual lines are designed such that they illuminate the respective detection range optimally.

In the far range mode the respectively outer three antenna arrays are used, and in the near range mode the individual lines lying on the inside. In the far range mode the transmitter has a vertical beam width of typically 5 degrees and in the near range mode a beam width of 10 degrees.

In order to determine the vertical position of objects, the antenna arrays or the individual lines are designed such that the main beam direction of the vertical diagram of an antenna or antenna array is typically aligned by 6 degrees upwards, the second antenna has no inclined sight and the third antenna squints downwards by 6 degrees.

The squinting of the antennas is achieved by the distance L between the individual beam elements being increased or decreased. The distance Ls in the antenna squinting by the angle θ can be described approximately by the formula $$Ls := \frac{L}{1 + \sin(\theta)}$$

Here, L is the distance between a first beam element and a second beam element. The distance between the second and a third beam element is then Ls.

The main array beam directions differ in relation to the y direction. The angle θ is the angle between the z axis and the main beam direction of the transmitting antenna. The greater the angle θ, the greater the vertical portion of the beam direction.

In order to determine the position of the object in the vertical, the transmitting antenna looking downwards, to the middle and upwards are activated one after the other from measuring cycle to measuring cycle. Objects which occur in each cycle with the same speed and distance are compared to one another. The object height can be determined from the amplitude ratio. The method is called "sequential lobing".

The vertical beam sweep is important in order to detect false targets such as bridges etc. and in order to make an auto-calibration when fitting and when changing the loading condition of the vehicle.

In order to extend the antenna aperture artificially in the horizontal to form a so-called synthetic aperture, the left antenna array and the right antenna array are activated alternately from modulation period to modulation period during a measuring cycle.

The measuring sequence looks for example as follows: first of all, in a first measuring cycle, the left antenna of the left or first transmitting antenna array and then the left antenna of the right or last transmitting antenna array is first of all activated. In a subsequent second measuring cycle the middle antenna of the left or first transmitting antenna array first of all, and then the middle antenna of the right or last transmitting antenna array is activated, and in a subsequent third measuring cycle the right antenna of the left or first transmitting antenna array first of all, and then the right or last antenna of the right transmitting antenna array is activated. After the third measuring cycle the method loops back to the first measuring cycle. During activation the frequency of the transmitter is varied according to the FMCW (frequency modulated continuous wave).

However, it is also alternatively possible, in a first phase, for the left, the middle and the right transmitting antenna of the left or first transmitting antenna array to be activated one after the other, and then for the left, the middle and the right transmitting antenna of the right or last transmitting antenna array to be activated after one another.

It is pointed out that the vertical sweep movement during use of the radar does not have to be implemented very often for the far range because the objects are still a relatively long way away from the radar sensor.

The left or first transmitting antenna array and the right or last transmitting antenna array are arranged here spaced apart from one another by the distance D as shown in FIG. 2. Here, the distance between the transmitting antenna arrays with the same beam direction is equal to D, the distance respectively being measured from the focal point of the respective transmitting antenna array. In this case the focal point is located in the phase centre that is respectively the middle of the lines of antennas. The distance D corresponds to the distance between the phase centre of the outermost left or first receiving antenna and the phase centre of the outermost right or last receiving antenna.

The position of the transmitting antenna arrangement must not necessarily lie opposite the receiving antenna array, as shown in FIG. 2. The transmitting antennas can be positioned at any point including to the left and to the right or directly adjacent to the receiving array. This is particularly advantageous if the installation height of the sensor is to be reduced, for example if the sensor is fitted in the bumper of a vehicle.

The signals of the receivers are first of all digitalised and then combined with one another by the "digital beam forming" method so that a bundled antenna beam is formed which corresponds to an antenna array of 2 times 16 lines of antennas. By means of appropriate phase shifting and weighting of the received signals of the individual lines this bundled beam can be aligned in the direction of the desired observation angle. The method is known as "forward looking SAR" in the literature.

Figure 3:
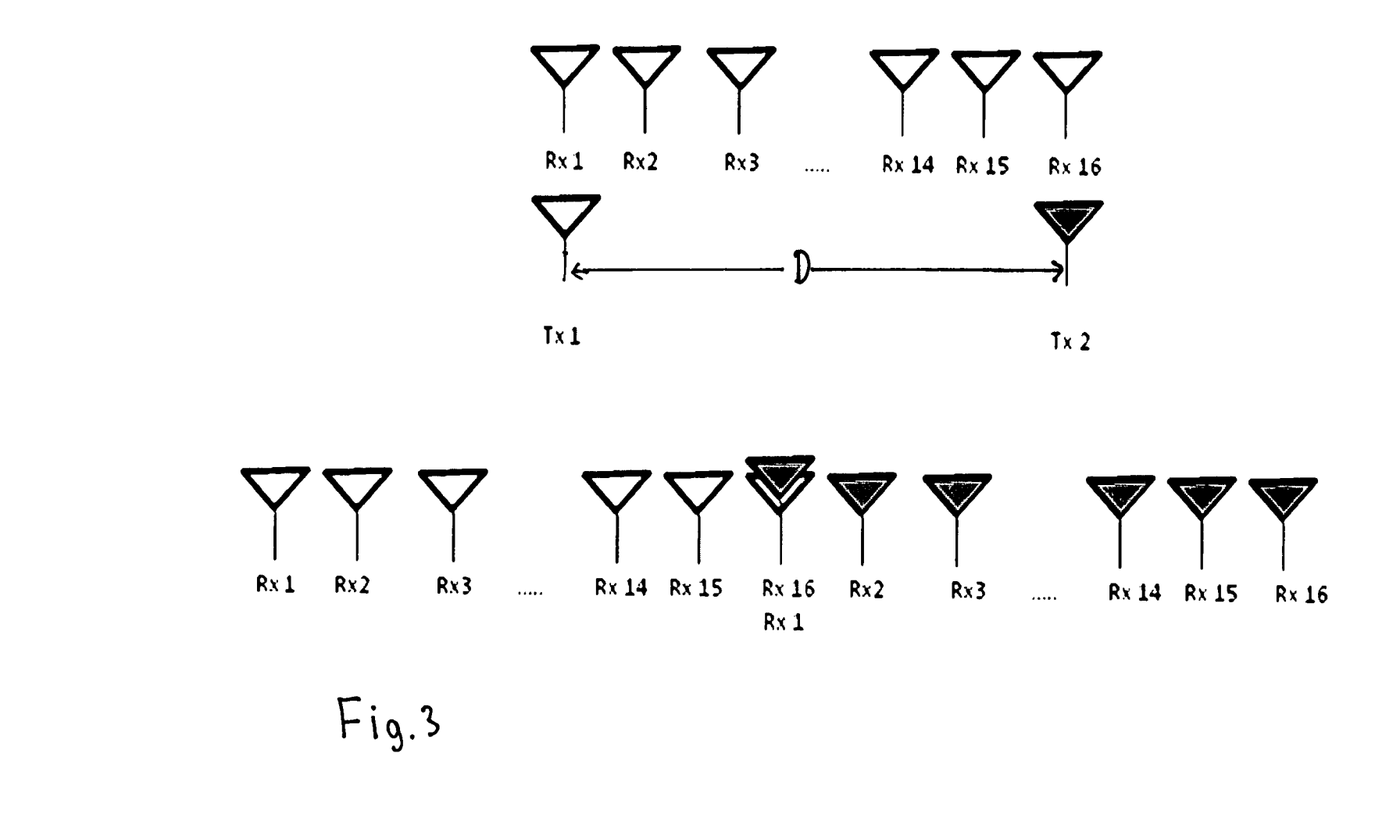
FIG. 3 the real aperture and the resulting synthetic arrangement according to a first embodiment and FIG. 4 the real aperture and the resulting synthetic arrangement according to a second embodiment.

In the top illustration FIG. 3 shows the real aperture and in the bottom illustration the synthetic arrangement of the radar.

One feature of this arrangement is that a real and a synthetic line of antennas come to lie on top of one another. From this one can deduce the requirement that these two lines of antennas must receive the same signals.

This is not the case, however, with moved objects because these can adopt different positions due to the time offset of the two signals received one after the other. The same also applies to different modulation states and to phase shifts which may be caused by the physical properties of the functional assemblies used. These shifts lead to distortion and false imaging in the radar image.

As disclosed by DE 10 2008 061 932 A1, correction factors for the digital beam forming can be determined from the signals of the receiving channels lying one over the other. The signal processing procedure required for this purpose is also described in DE 10 2008 061 932 A1 which is herewith incorporated as part of the description by reference.

Figure 4:
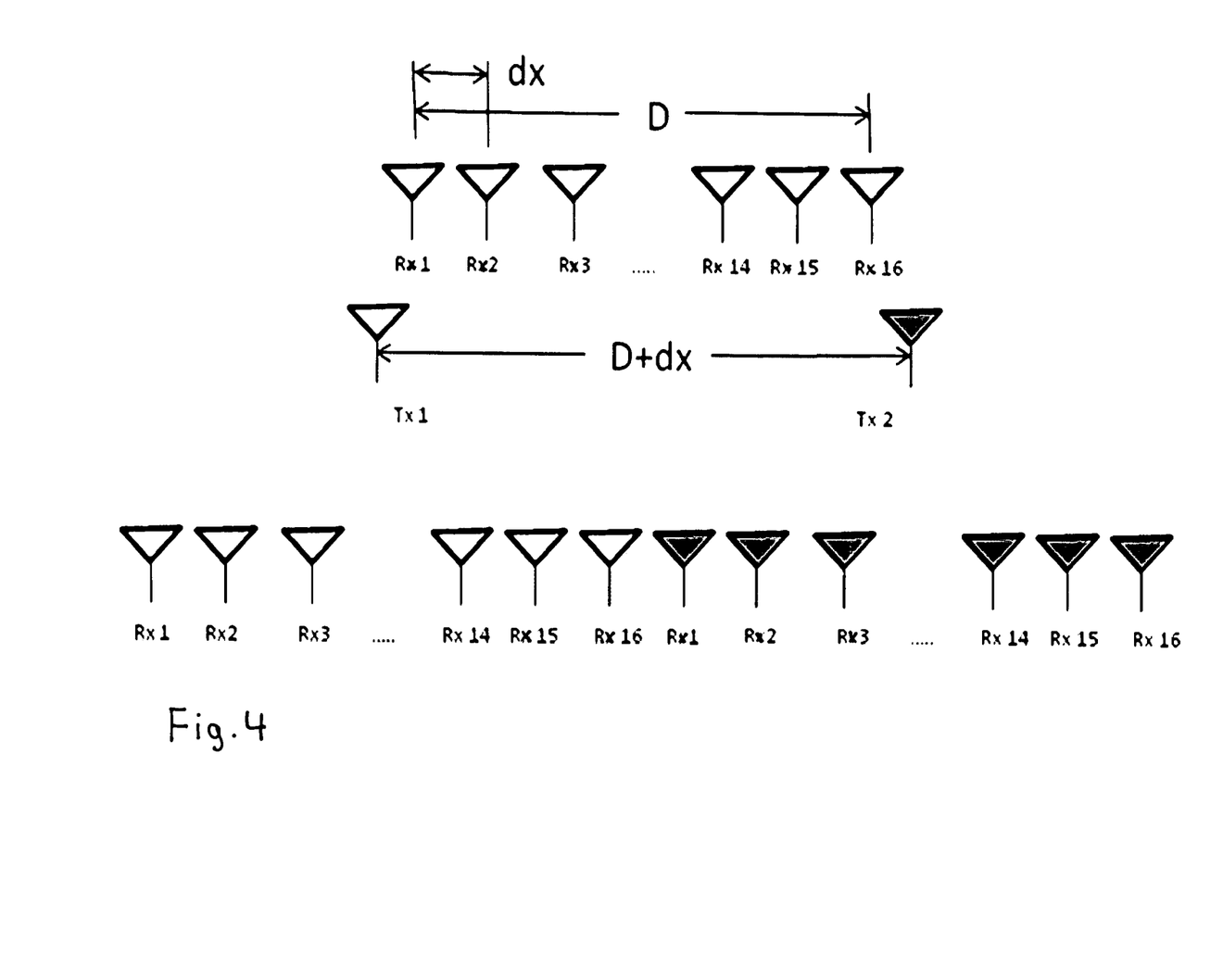

FIG. 4 shows the apertures for a second embodiment of the radar, the illustration at the top showing the real aperture and the illustration at the bottom showing the synthetic aperture. According to a second embodiment the transmitters are arranged a distance D+dx apart. This means that the distance between the transmitting antennas with a parallel main beam direction of the outer transmitting antenna arrays is equal to D+dx.

Here, dx is the distance between the two receiving antennas, in this case between phase centres of outer receiving antennas lying next to one another. A synthetic array results, as shown in FIG. 4. The antenna aperture is then utilised optimally.

However, correction factors can not be obtained now from the signals from overlapping lines of antennas. In this case a speed-dependent Doppler correction is to be calculated in order to compensate for the phase shift of the received signals by the object movement. This phase shift can be calculated from the known time offset between activation of the left or first and the right or last transmitter and the object speed. The object speed is known from the so-called range-Doppler matrix. The range-Doppler matrix performs the function of a multi-channel Doppler filter. For each individual filter the signal phase is now to be corrected by the value $\Delta\phi$ according to the formula $$\Delta\phi := 2\cdot\pi\cdot\mathrm{ldopp}\cdot\delta fd\cdot\Delta T$$

with ldopp: Doppler filter No.
δfd: band width of the Doppler filter
ΔT: time offset between the activation of the left or first and of the right or last transmitter.

In a further embodiment further transmitter antenna arrays can be added, the distance between a further and an already existing transmitting antenna array respectively being D or D+dx. Then the synthetic array thereby respectively increases equivalently.

LIST OF REFERENCE NUMBERS 1 transmitter
2 receiver circuit
10 transmitting antenna
11 driver
12 amplifier
13 frequency generator
14 frequency divider
16 modulator
17 transmitting array element
18 final driver
19 driver stage
20 receiving antenna
21 mixer
22 frequency multiplier
23 strip line
24 receiving beam element
28 line of antennas
36 transmitting antenna array

The invention claimed is:

1. A device for determining a position of an object, comprising:
   a first switchable transmitting antenna array and a second switchable transmitting antenna array, the first and the second transmitting antenna arrays each having a number of transmitting antennas which differ from one another as regards their main beam directions with respect to a vertical dimension,
   a receiving antenna arrangement comprising a plurality of receiving antennas which are arranged next to one another in a continuous row along a horizontal direction starting from a first receiving antenna and ending at a last receiving antenna,
     wherein the first and the last receiving antennas each comprise at least three respective parallel lines of receiving beam elements,
     wherein for each of the first and the last receiving antennas, a middle line of receiving beam elements defines a phase center of that receiving antenna, and
     wherein receiving antennas between the first and the last receiving antennas each comprise no more than one line of receiving beam elements,
   the first and the second transmitting antenna arrays being arranged such that a horizontal distance between any two transmitting antennas having the same main beam direction with respect to the vertical dimension:
     is equal to a horizontal distance between a phase center of the first receiving antenna and a phase center of the last receiving antenna, or
     is equal to a sum of:
       the horizontal distance between the phase center of the first receiving antenna and the phase center of the last receiving antenna and
       a horizontal distance between two adjacent receiving antennas, wherein the first and the second transmitting antennas are arranged along a common side of the receiving antennas or along opposing sides of the receiving antennas.

2. The device according to claim 1, wherein the transmitting antennas of the first and the second transmitting antenna arrays each comprise at least three respective parallel lines of transmitting beam elements, wherein for each of the transmitting antennas of the first and the second transmitting antenna arrays, a middle line of transmitting beam elements defines a phase center of that transmitting antenna.

3. The device according to claim 1, further comprising a frequency generator configured to produce signals which are issued by the transmitting antennas of the first transmitting antenna array in a first cycle and by the transmitting antennas of the second transmitting antenna array in a chronologically following second cycle.

4. The device according to claim 3, wherein within the first and second cycles, the transmitting antennas of one transmitting antenna array respectively transmits with different main beam directions consecutively in time.

5. The device according to claim 1, wherein the device includes 8, 16 or 32 receiving antennas.

6. The device according to claim 1, wherein the device includes 6 or 12 transmitting channels corresponding to a near range and 6 or 12 transmitting channels corresponding to a far range.

7. The device according to claim 1, wherein the transmitting antennas and the receiving antennas are configured, in combination, to detect the object according to a far range.

8. The device according to claim 1, further comprising a display device configured to show the position of the object by displaying an antenna diagram.

9. A radar system comprising the device for determining the position of the object according to claim 1.

10. A method for determining a position of an object, comprising the procedural steps:
receiving, using a receiving antenna arrangement, a series of signals transmitted consecutively in time by a first switchable transmitting antenna array and a second switchable transmitting antenna array and reflected on the object,
the receiving antenna arrangement comprising a plurality of receiving antennas which are arranged next to one another in a continuous row along a horizontal direction starting from a first receiving antenna and ending at a last receiving antenna,
wherein the first and the last receiving antennas each comprise at least three respective parallel lines of receiving beam elements,
wherein for each of the first and the last receiving antennas, a middle line of receiving beam elements defines a phase center of that receiving antenna,
wherein receiving antennas between the first and the last receiving antennas each comprise no more than one line of receiving beam elements,
the first and the second transmitting antenna arrays each having a number of transmitting antennas which differ from one another as regards their main beam directions with respect to a vertical dimension,
the first and the second transmitting antenna arrays being arranged such that a horizontal distance between any two transmitting antennas having the same main beam direction with respect to the vertical dimension:
is equal to a horizontal distance between a phase center of the first receiving antenna and a phase center of the last receiving antenna, or
is equal to a sum of:
the horizontal distance between the phase center of the first receiving antenna and the phase center of the last receiving antenna and
a horizontal distance between two adjacent receiving antennas, and
wherein the first and the second transmitting antennas are arranged along a common side of the receiving antennas or along opposing sides of the receiving antennas, digitalizing the received signals,
combining the received signals by a digital beam forming method to form a bundled antenna beam,
making a speed correction and a distance correction using a two-dimensional FFT by comparing output signals of overlapping lines of receiving and transmitting beam elements corresponding to the bundled antenna beam,
comparing amplitudes of the received signals corresponding to different main beam directions of the transmitting antennas and having a same distance value and a same speed value, and
displaying the position of the object.

11. The method according to claim 10, further comprising evaluating amplitudes of adjacent antenna beams.

12. The method according to claim 10, further comprising evaluating a sum of and a difference between two adjacent antenna beams.

* * * * *